United States Patent Office 2,857,772
Patented Oct. 28, 1958

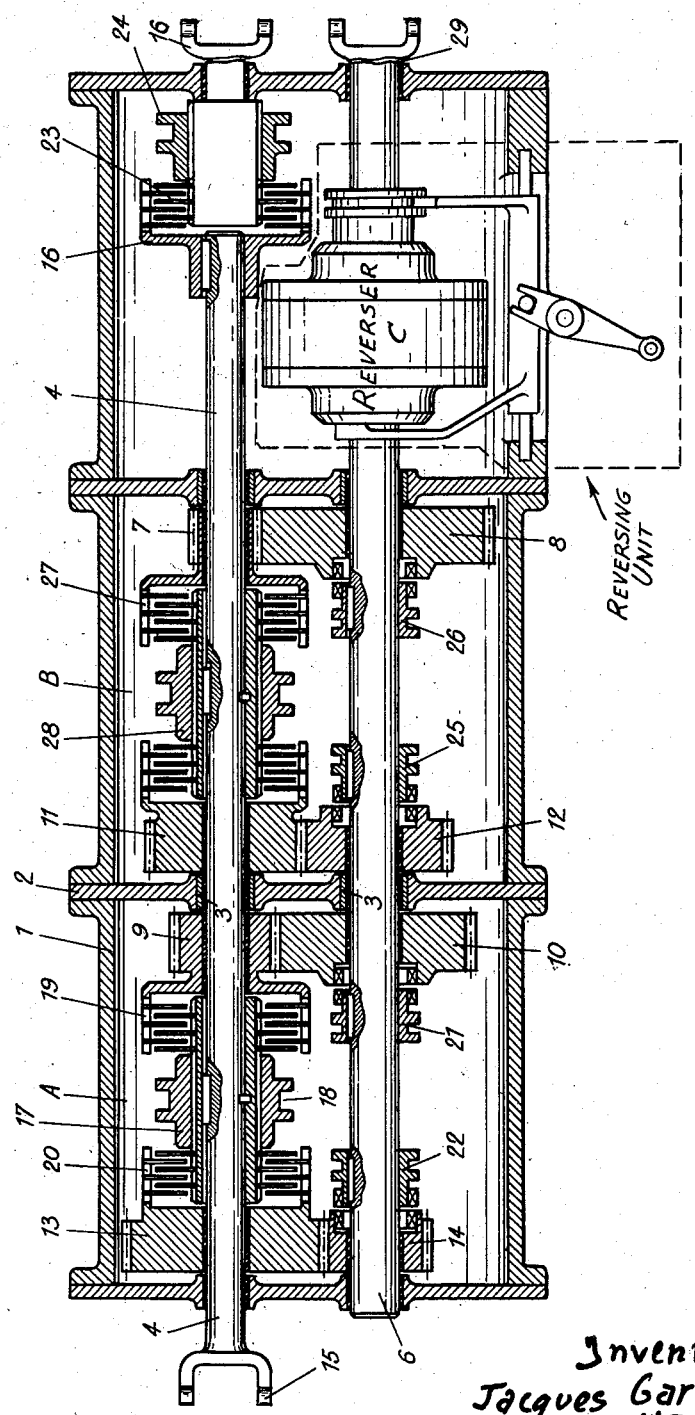

2,857,772
CHANGE SPEED GEARINGS

Jacques Garnier, Neuilly sur Seine, and Richard Haze, Saint Ouen, France, assignors to Societe d'Etudes et de Recherches Pour Engins Mecaniques (S. E. R. E. M.) Société Civile française Application June 29, 1955, Serial No. 518,904

Claims priority, application France July 1, 1954

6 Claims. (Cl. 74—359)

This invention relates to change speed gearing and has for its object to provide a gear-box which is distinguished more particularly by the linear arrangement of its elements, by virtue of which the gear-box is adapted to be readily constructed by juxtaposing elements each corresponding to two stages of speed.

According to another feature of the invention, the primary shaft and the secondary shaft of the gearing extend through the said elements from end to end thereof, reverse gear being provided by a reverser preferably of the epicyclic type. Under these conditions, the primary shaft, which is driven directly by the engine, supplies to the other end of the gear-box a power take-off independent of the combinations of gear ratios provided by the gear-box. On the other hand, reverse gear benefits from all the said combinations, so that it becomes possible to construct vehicles adapted to move equally well in both the forward and reverse directions.

In the gear-box according to the invention, the pinions of the various gear trains, which may be straight-toothed gears, double-toothed helical gears or gears of any other desired profile, are in constant mesh. The pinions carried by the primary shaft rotate idly thereon, and a clutch which is common to the two stages of each element in the gear-box enables the pinions to be rotated solidly with the said primary shaft at choice.

Similarly, the pinions of the various gear trains carried by the secondary shaft rotate idly thereon, and a set of two dogs common to the two stages of each element in the gear-box renders the pinions capable of rotating solidly with the said secondary shaft at choice.

In a simplified embodiment which may be used if linear speeds do not become excessive, the pinions which are associated with various stages and which are borne by the secondary shaft rotate solidly therewith, in which case all the pinions in the gear-box rotate simultaneously. In this case, the selection of any gear ratio is effected merely by engaging the corresponding pinion with the primary shaft, through the medium of the associated clutch.

It will be apparent that the cross-sectional area of a gear-box constructed according to the invention will be of very small dimensions, a feature of advantage in certain applications such as, for instance, agricultural tractors.

For a better understanding of the invention and to show how the same may be carried into effect reference will now be made to the accompanying drawing which is a schematic cross-sectional view of a gear-box in accordance with the invention.

Referring to the drawing, the gear-box is composed of a pair of two-speed elements A and B and thus provides four forward speeds which an epicyclic reverser C of known construction, forming part of a reversing unit, converts at choice into four reverse speeds. The reversing unit may be of the type described in United States Patent No. 1,509,498 granted to Charles E. Starr on September 23, 1924.

In the drawing herein, the reversing unit is shown inside a box in dotted line and labeled "reversing unit."

Each element comprises a casing 1 connected by flanges to the following element with the interposition of a partition 2 journalled on bearings or rollers 3 for supporting the primary shaft 4 and the secondary shaft 6.

First gear is produced by the pinion train 7, 8, second gear by the pinion train 9, 10, third gear by the pinion train 11, 12, and top gear by the pinion train 13, 14.

The primary shaft 4 is connected to the engine through any suitable form of coupling, one of the elements of which is designated 15. The other end of the primary shaft carries a power take-off coupling element 16 constructed to suit the machine fitted with a gear-box in accordance with the invention and comprising a multiple-disc plate clutch 23 controlled by a sliding sleeve 24. The secondary shaft 6 is connected at the output end of the gear-box to the epicyclic reverser C.

If consideration is now given to the element A of the gear-box, it will be seen that there is disposed between the two pinions 9, 13 of the two corresponding speed stages a double multiple-disc plate clutch, the sleeve 17 of which is keyed to and adapted to slide along the shaft 4 and is controlled by a selector fork of known construction (not shown) acting in a slot 18. The two end bell housings 19, 20, of the said clutch carry pinions 9 and 13, respectively.

Corresponding with each of the pinions 10 and 14 on the secondary shaft 6 is one of the two dogs 21, 22 which are keyed to and adapted to slide along the shaft 6 and which are controlled by selector forks in the conventional manner.

The drawing illustrates all the elements in the released position, only the primary shaft 4 rotating and transmitting its movement to the power take-off coupling element 16.

To engage first gear, the dog 26 of the element B is moved towards the right as shown in the drawing to engage with the pinion 8, whereafter the clutch bell-housing 27 is engaged by movement of the sleeve 28 towards the right. Rotation of the shaft 4 is therefore transmitted to the shaft 6 with the reduction provided by the pinions 7 and 8. Either the reverser C is inoperative and the shaft 29 transmits the torque of the secondary shaft positively, or the reverser C is operative and the shaft 29 transmits the said torque negatively, if desired with further reduction.

The epicyclic reverser C is of known construction and need not therefore be described in detail, since it lies outside the scope of the invention.

To engage second gear, the dog 21 is moved towards the right, as also is the clutch sleeve 17, so as to transmit to the shaft 6, through the pinions 9 and 10, the rotation of shaft 4.

To engage third gear, the dog 25 and the sleeve 28 are moved towards the left.

To engage top gear, the dog 22 and the sleeve 17 are moved towards the left.

It will be noted that this method of operation completely obviates the lacuna between two consecutive stages of gear reduction or multiplication. It is possible to pass continuously from one gear ratio to the next, by the operation of the corresponding clutches, and it is for this reason that, according to the invention, two consecutive stages are included in two different elements of the gear-box, so as to permit the requisite straddling between release of the clutch corresponding to the disengaged gear and engagement of the clutch corresponding to the engaged gear. The existence of the said lacuna is particularly disadvantageous, for example, in agricultural tractors in which the impetus of the vehicle is zero, so that upon declutching, the vehicle immediately loses speed, with the result that it sometimes becomes very difficult to engage the following speed change. Of course, the operation of the corresponding dog selector forks is carried out at a suitable time.

This operation of the dogs, and likewise the operation of the clutches, can be effected manually and arbitrarily in a conventional manner. Such operation can also be effected, for example, by hydraulic or electric control means, thus simplifying driving and producing a suitable sequence of operations automatically with or without being subjected to intervention by the driver. This control means and details of the construction thereof do not come within the scope of the invention.

It will also be apparent that the constructional details of the various elements of the apparatus described and illustrated, more particularly of the clutches, may vary considerably from the details illustrated in the drawing by way of example, the applicant reserving the right to use, if desired, commercially available mechanisms. Similar considerations apply to the epicyclic reverse.

Mention has already been made herein as to the advantage derived from the employment of a gear-box of small transverse dimensions such as that according to the invention, in conjunction with agricultural tractors. The gear-box according to the invention permits of a useful downward increase in the driver's field of vision.

What is claimed is:

1. Variable speed gearing comprising a first gear housings, a second gear housing and a third gear housing, disposed adjacent each other, partitions located between each said housing, a drive shaft, a driven shaft parallel to said drive shaft, bearings for said drive shaft and said driven shaft carried by each of said partitions, a first pair of pinions disposed on said drive shaft and within the first gear housing, a second pair of pinions disposed on said drive shaft within the second gear housing, clutch plates carried by said first pair of pinions and said second pair of pinions, a first sleeve keyed to and axially slidable on said drive shaft and disposed intermediate of said first pair of pinions, a second sleeve keyed to and axially slidable on said drive shaft and disposed between said second pair of pinions, clutch plates carried by said first sleeve for selective engagement with the clutch plates of said first pair of pinions, clutch plates carried by said second sleeve for selective engagement with other clutch plates carried by said second pair of pinions, a first pair of pinions disposed on said driven shaft and within said first gear housing, a second pair of pinions disposed on said driven shaft within said second gear housing, dogs on the last-mentioned pair of pinions, a pair of dogs slidable axially on said driven shaft for selective engagement with the dogs on said last-mentioned pinions, a power take-off coupling disposed on said drive shaft and within said third gear housing, clutch means arranged to selectively couple said power take-off coupling and said drive shaft for unitary motion and means connected to said driven shaft and disposed within said third gear housing for effecting a reverse drive.

2. Variable speed gearing comprising a first gear housing, a second gear housing and a third gear housing, disposed adjacent each other, partitions located between each said housing, a drive shaft, a driven shaft parallel to said drive shaft, bearings for said drive shaft and said driven shaft carried by each of said partitions, a first pair of pinions disposed on said drive shaft and within the first gear housing, a second pair of pinions disposed on said drive shaft within the second gear housing, clutch plates carried by said first pair of pinions and said second pair of pinions, a first sleeve keyed to and axially slidable on said drive shaft and disposed intermediate of said first pair of pinions, a second sleeve keyed to and axially slidable on said drive shaft and disposed between said second pair of pinions, clutch plates carried by said first sleeve for selective engagement with the clutch plates of said first pair of pinions, clutch plates carried by said second sleeve for selective engagement with other clutch plates carried by said second pair of pinions, a first pair of pinions disposed on said driven shaft and within said first gear housing, a second pair of pinions disposed on said driven shaft within said second gear housing, dogs on the last-mentioned pair of pinions, a pair of dogs slidable axially on said driven shaft for selective engagement with the dogs on said last-mentioned pinions, a power take-off coupling disposed on said drive shaft and within said third gear housing, a multi-plate friction clutch arranged to selectively couple said power take-off coupling and said drive shaft for unitary motion and epicyclic gearing operatively connected to said driven shaft and disposed within said third gear housing for effecting a reverse drive.

3. Variable speed, multiple combination gearing comprising in combination: a gear box; juxtaposed gear units each corresponding to two speed ratios; a primary drive shaft; a secondary driven shaft parallel to said primary shaft; said primary and said secondary shafts being common to said gear units; said gear units being traversed from end to end respectively by said primary shaft and by said secondary shaft; an epicycloidal inversor adapted to effect a reverse drive; each gear unit including a pair of variable ratio gear couples, the elements of said gear couples being idly rotatable on said drive shaft and said driven shaft respectively; clutch means common to the elements of each pair of gear couples disposed on said drive shaft to selectively couple said elements to said drive shaft for unitary rotation therewith; means for selectively coupling the elements of each pair of gear couples disposed on said driven shaft for unitary rotation therewith; said gear units in the successive stages of speed ratios corresponding alternately to succeeding elements, in order to permit a straddling between the release of the clutch in one stage and the engagement of the clutch in the succeeding stage.

4. A gearing as claimed in claim 3 further comprising a gearing extending said primary shaft outside said box and adapted to form an independent power take-off.

5. A gearing as claimed in claim 3, in which said inversor is mounted at an end of said secondary shaft.

6. A gearing as claimed in claim 3, in which each gear unit is a standard assembly adapted to be juxtaposed to adjacent gear units, a partition being interposed in which the bearings for the primary shaft and the secondary shaft are mounted.

References Cited in the file of this patent
UNITED STATES PATENTS

| | | |
|---|---|---|
| 936,300 | Brunhouse | Oct. 12, 1909 |
| 2,682,327 | Retz | June 29, 1954 |